(12) United States Patent  
Grimm et al.

(10) Patent No.: US 8,770,658 B2
(45) Date of Patent: Jul. 8, 2014

(54) SLIDING ROOF SYSTEM

(75) Inventors: Rainer Grimm, Frankfurt (DE); Stefan Vogel, Ortenberg (DE)

(73) Assignee: Roof Systems Germany GmbH (DE)

( * ) Notice: Subject to any disclaimer, the term of this patent is extended or adjusted under 35 U.S.C. 154(b) by 0 days.

(21) Appl. No.: 13/298,850

(22) Filed: Nov. 17, 2011

(65) Prior Publication Data

US 2012/0126586 A1   May 24, 2012

(30) Foreign Application Priority Data

Nov. 19, 2010   (EP) ..................................... 10014787

(51) Int. Cl.
*B60J 7/19* (2006.01)

(52) U.S. Cl.
USPC ......................................................... 296/224

(58) Field of Classification Search
USPC ............................................ 296/216.01–224
See application file for complete search history.

(56) References Cited

U.S. PATENT DOCUMENTS

| 4,746,165 | A | * | 5/1988 | Fuerst et al. | ............. | 296/216.03 |
| 4,877,285 | A | * | 10/1989 | Huyer | ...................... | 296/216.03 |
| 5,058,947 | A | * | 10/1991 | Huyer | ...................... | 296/216.03 |
| 5,154,482 | A | * | 10/1992 | Hayashi et al. | ................ | 296/223 |
| 5,405,185 | A | * | 4/1995 | Cheron et al. | ................ | 296/223 |
| 5,746,475 | A | * | 5/1998 | Caye et al. | .................... | 296/223 |
| 5,765,908 | A | * | 6/1998 | Kelm | ............................. | 296/223 |
| 5,879,049 | A | * | 3/1999 | Sinelli | ........................... | 296/223 |
| 5,971,473 | A | * | 10/1999 | Kelm | ............................. | 296/223 |
| 6,419,310 | B1 | * | 7/2002 | Manders | ........................ | 296/223 |
| 6,454,347 | B2 | * | 9/2002 | Lee et al. | ....................... | 296/223 |
| 6,942,287 | B2 | | 9/2005 | Bohm et al. | | |
| 7,144,077 | B2 | * | 12/2006 | Grimm et al. | ................. | 296/223 |
| 7,510,237 | B2 | * | 3/2009 | Tsukamoto et al. | .......... | 296/224 |
| 7,784,859 | B2 | | 8/2010 | Grimm et al. | | |
| 7,850,231 | B2 | * | 12/2010 | Ito et al. | .................. | 296/220.01 |
| 2003/0011215 | A1 | * | 1/2003 | Arnold et al. | ................. | 296/223 |
| 2009/0160223 | A1 | | 6/2009 | Grimm et al. | | |

FOREIGN PATENT DOCUMENTS

| DE | 102006060019 | A1 | 6/2008 |
| DE | 10213994 | A1 | 10/2013 |
| EP | 0403388 | A1 | 12/1990 |
| EP | 1275541 | A1 | 7/2001 |
| EP | 2 072 304 | A1 | 6/2009 |

OTHER PUBLICATIONS

European Search Report dated Feb. 22, 2011.
English Abstract for EP0403388.
English Abstract for DE102006060019.
English Abstract for EP 2 072 304.

* cited by examiner

*Primary Examiner* — Dennis Pedder
(74) *Attorney, Agent, or Firm* — Cantor Colburn LLP

(57) ABSTRACT

A sliding roof system for a motor vehicle, having at least one guide rail, a cover holder which is adjustable relative to the guide rail, and a slide which is shiftable in the guide rail, wherein the slide and the cover holder each have a locking member provided thereon, each locking member being configured to engage into each other at least when the cover holder is in the closed position.

16 Claims, 8 Drawing Sheets

SLIDING ROOF SYSTEM

CROSS REFERENCE TO RELATED APPLICATIONS

This application claims priority under 35 USC 119 to the following European Patent Application No. EP 10 014 787.5 filed Nov. 19, 2010, the contents of which are incorporated herein by reference thereto.

BACKGROUND

The invention relates to a sliding roof system for a motor vehicle, including at least one guide rail, a cover holder which is adjustable relative to the guide rail, and a slide which is shiftable in the guide rail.

An example of such a sliding roof system can be found in EP 2 072 304 A. It serves to attach a cover 10 (see FIG. 1) to a vehicle roof in such a way that the cover can be shifted between a closed position, in which it closes an opening in the vehicle roof, and various more or less fully opened positions. The cover 10 is fitted to a cover holder 12 which is adjustably accommodated in a guide rail 14 by means of various interconnected components. In practice, typically two guide rails and, accordingly, two cover holders are used, namely, at the lateral edges of the roof as viewed in the direction of travel. For adjusting the cover holder 12, a slide 16 is provided which is mounted for sliding movement in the guide rail, is adjusted by a drive cable (not shown), and determines the position of the cover holder 12. By shifting the slide along the guide rail 14, the cover holder 12 and thus the cover 10 can be transferred from the closed position shown in FIG. 1 via a ventilation position shown in FIG. 2 to a raised position shown in FIG. 3. In the ventilation position, the rear edge of the cover 10 as viewed in the direction of travel is raised outward while the front edge of the cover rests substantially unchanged against the front edge of the roof opening. In the position raised outward, the cover holder is lifted outward so far that the cover 10 can be transferred rearward, as a result of which the roof opening associated with it is exposed.

One requirement placed on all sliding roof systems, irrespective of the specific configuration of the adjustment mechanism, resides in that the cover be held as stably as possible in the vertical direction, that is, the z-direction, when the cover is in the closed position or also in the ventilation position. In fact, due to the flow conditions in the roof area, a partial vacuum acts on the front edge of the cover which attempts to pull the front edge of the cover upward. If the cover is not stably mounted, this would result in the front edge of the cover protruding over the adjacent roof area. This would lead to undesirable flow noises.

The object of the invention resides in further developing a sliding roof system of the type initially mentioned to the effect that the front edge of the cover is held particularly precisely on the vehicle in the vertical direction.

SUMMARY OF THE INVENTION

To achieve this object, the slide and the cover holder each have a locking member provided thereon, which engage into each other at least when the cover holder is in the closed position. The invention is based on the fundamental concept of providing, in the region of the front edge of the cover, a mechanical locking mechanism which is actuated directly by the slide. As long as the slide is in a pushed-forward position, the locking members engage into each other, so that the front edge of the cover cannot be pulled upward. Only when the slide has moved sufficiently far to the rear in the course of its control movement is the locking mechanism released, and the cover can be adjusted in the usual manner. The advantage of this locking consists in that no additional actuating devices are required for carrying out the locking process. The advantage further consists in that the cover holder is locked directly (by means of the slide) on the guide rail, so that no external tolerances come into play, for example due to the assembly of the guide rail at the vehicle roof. Also, it is not required to readjust the locking mechanism following a setting of the correct position of the guide rail relative to the roof.

Preferably, provision is made that one of the locking members is an opening and the other is a projection which can be transferred into the opening. In this way, a mechanically simple structure is produced.

The opening is preferably provided on the cover holder, and the projection is rigidly fitted to the slide. This allows the shifting motion of the slide to be directly used for pushing the projection into the opening on the cover holder.

According to a preferred embodiment, provision is made that the projection includes an abutment edge which is set obliquely relative to the adjustment direction of the slide. In this way, a pretention can be applied to the cover holder in the locked condition.

According to a variant embodiment, it is provided for that the projection is formed by two arms arranged parallel to each other. In this way, a pretension can be generated also in the y-direction when the projection is inserted into the opening.

In one embodiment a sliding roof system for a motor vehicle is provided, the sliding roof system having at least one guide rail, a cover holder which is adjustable relative to the guide rail, and a slide which is shiftable in the guide rail, wherein the slide and the cover holder each have a locking member provided thereon, each locking member being configured to engage into each other at least when the cover holder is in the closed position.

BRIEF DESCRIPTION OF THE DRAWINGS

The invention will now be described below with reference to an embodiment which is illustrated in the accompanying drawings, in which.

DETAILED DESCRIPTION OF EXEMPLARY EMBODIMENTS

Figure 1:
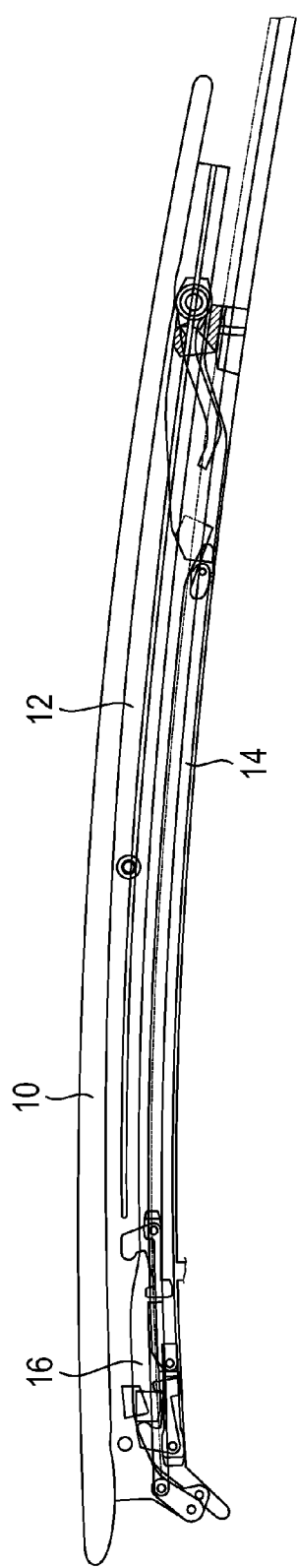
FIG. 1 shows a side view of the sliding roof system disclosed in EP 2 072 304 A in a schematic side view, the cover being in a closed position.
Figure 2:
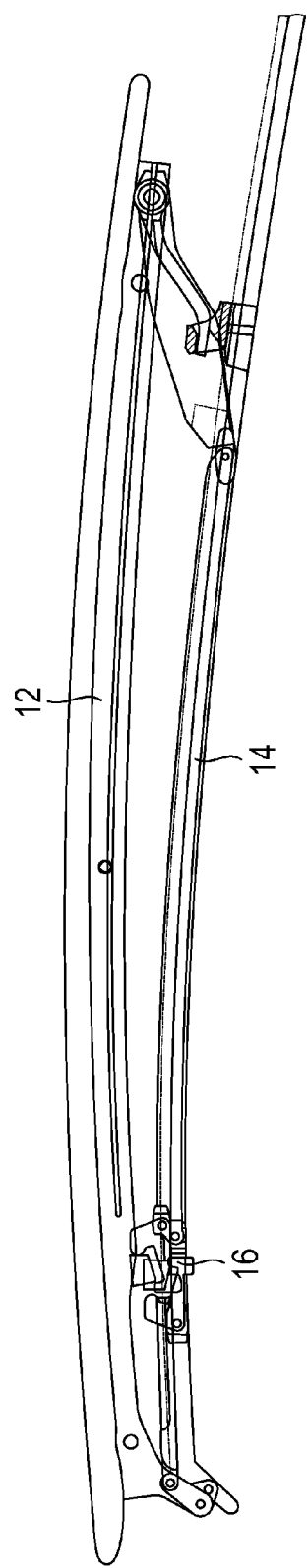
FIG. 2 shows the sliding roof system of FIG. 1, the cover holder being in a ventilation position.
Figure 3:
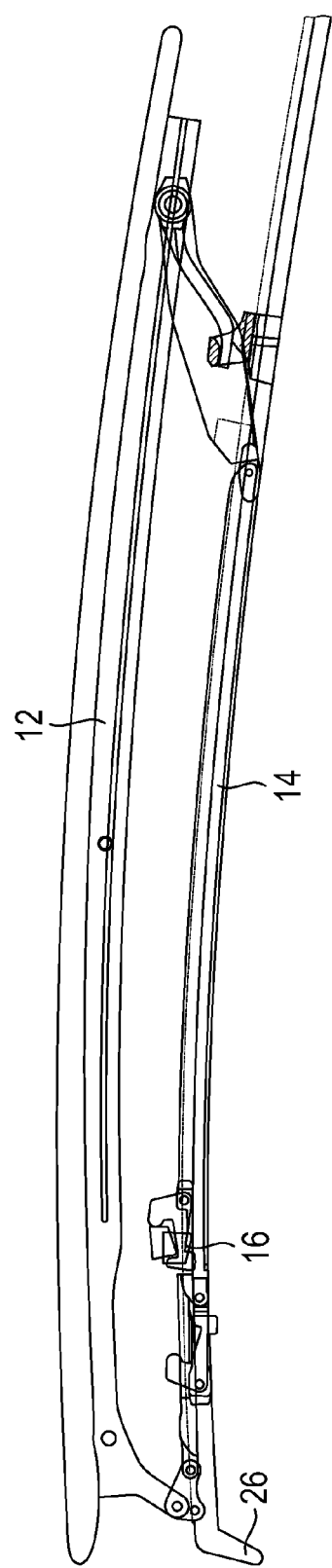
FIG. 3 shows the sliding roof system of FIG. 1, the cover holder being in a raised outward position.
Figure 4:
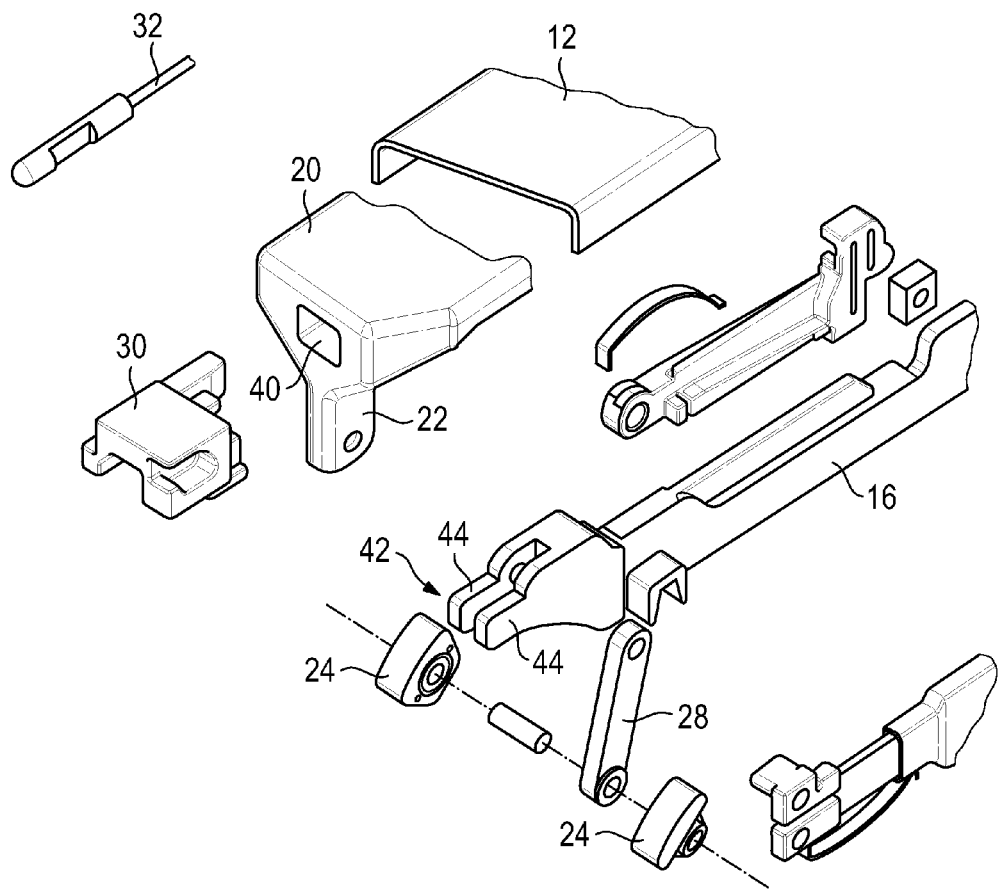
FIG. 4 shows a schematic exploded view of part of the components of a sliding roof system according to the invention.
Figure 5:
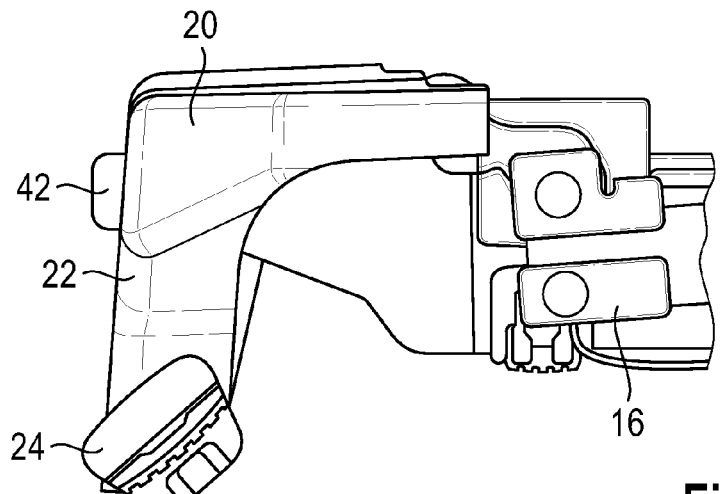
FIG. 5 shows a schematic, broken-away view of the cover holder locked on the slide.

The sliding roof system according to the invention will now be explained with reference to FIGS. 4 to 7.

The cover holder 12, which may be in the form of a bent sheet metal part, for example, is provided with a sliding member 20 which is fitted to the front end of the cover holder 12. The sliding member is provided with an extension 22 which protrudes downward and to which two sliding blocks 24 are fitted for pivotal movement. The sliding blocks 24 engage into a guide slot 26 of the guide rail 14.

Coupled to the sliding member 20 is the slide 16 by means of a connecting member 28. The slide 16 is adjusted in the guide rail 14 by an entrainment means 30 which is engaged by a drive cable 32 which is schematically indicated here.

The further components such as locking levers, springs, etc. are of no significance to the basic mode of functioning and will therefore not be discussed in more detail.

Figure 6:
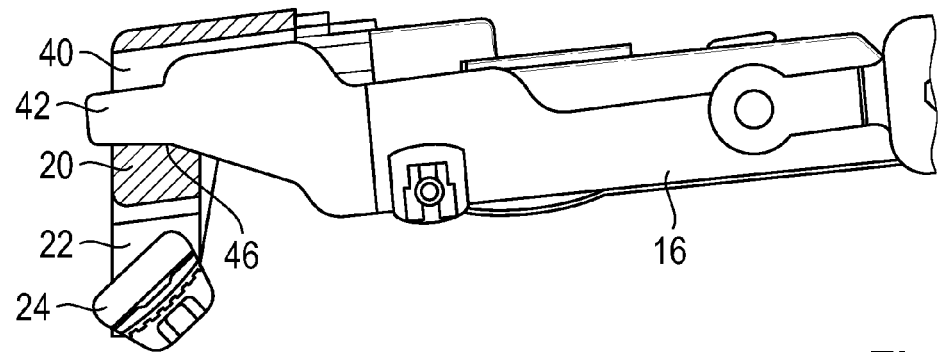
FIG. 6 shows a view corresponding to FIG. 5, the cover holder being shown in a section.
Figure 7:
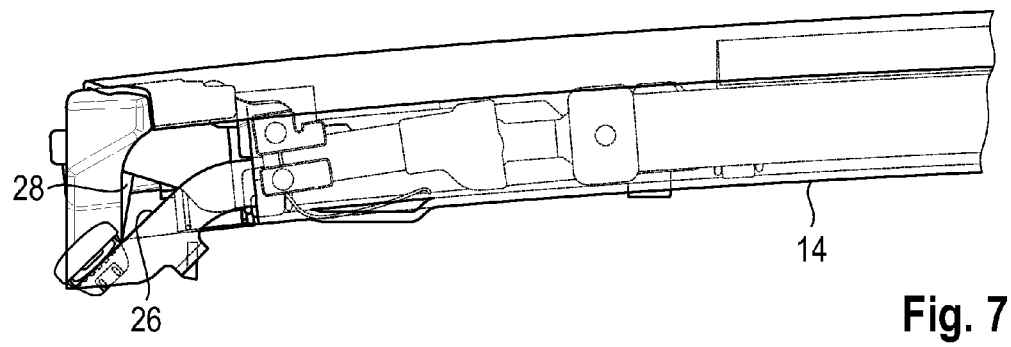
FIGS. 7-12 show a sliding roof system according to the invention in a schematic side view in different stages of the transition from a closed condition to an open condition.

The sliding member 20 is provided with an opening 40 extending through it in the longitudinal direction (see also FIG. 6) which acts as a locking member. Furthermore, the slide 16 is provided with a projection 42 at its front end as viewed in the longitudinal direction of the vehicle, the projection likewise acting as a locking member. In the embodiment shown here, the projection 42 is formed by two arms 44 extending parallel to each other. As can be seen in particular in FIG. 6, the projection 42 is configured such that it can extend through the opening 40, with the lower edge of the projection 42 acting as an abutment edge 46 (see FIG. 6) which rests against the edge of the opening 40 of the sliding member 20. FIG. 6 also shows that the abutment edge 46 is set slightly obliquely, as related to the longitudinal direction of the slide and thus to the shifting direction of the slide.

When the sliding roof system is in the closed position, the projection 42 on the slide 16 engages into the opening 40 in the sliding member of the cover holder 12, so that the abutment edge 46 either touches the sliding member 20 or is located opposite thereto at a very small distance. In this way, the cover holder 12 is prevented from being moved upward, that is, in the positive z-direction, in the region of the sliding member 20 (and thus the front edge of the cover 10 is prevented from being moved upward). Any forces acting on the front edge of the cover, seeking to pull the latter upward, are introduced directly into the guide rail 14 by means of the sliding member 20 and the abutment edge 46 on the projection 42 of the slide 16; any vertical shifting of the cover outward is therefore reliably prevented.

Figure 8:
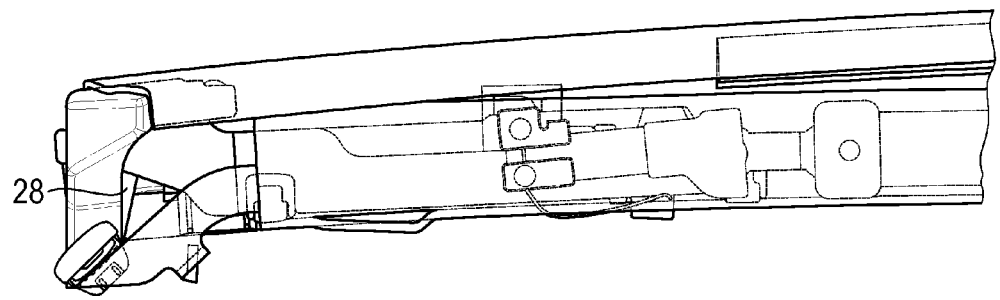
Figure 9:
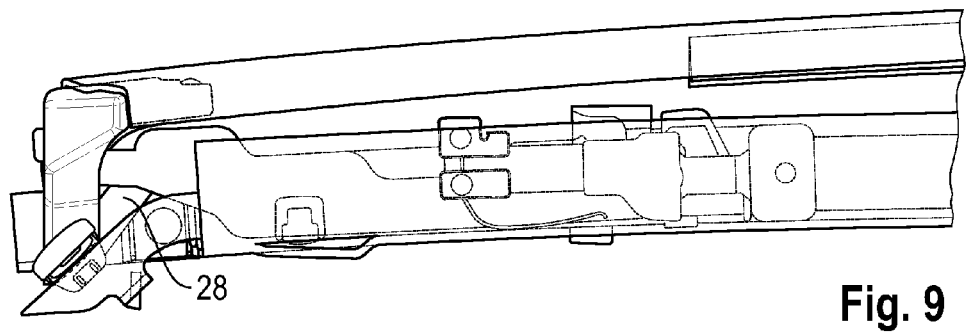
Figure 10:
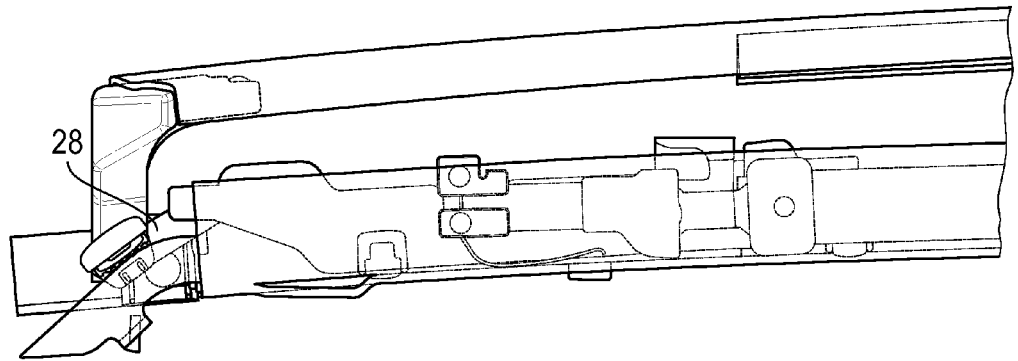
Figure 11:
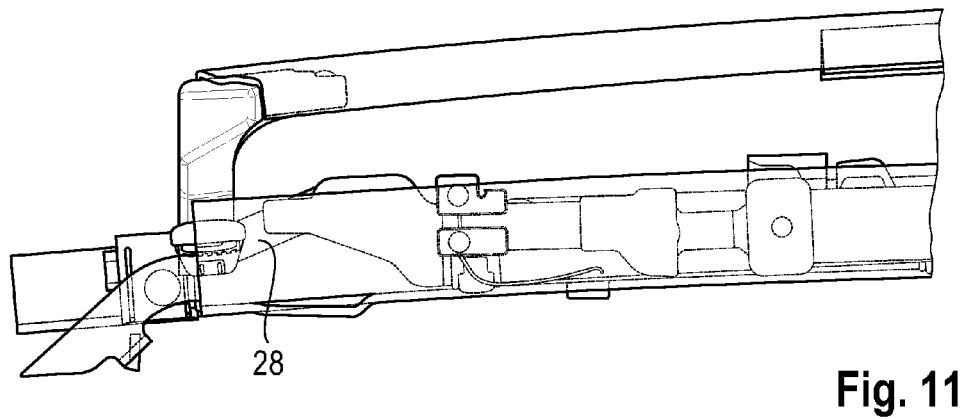
Figure 12:
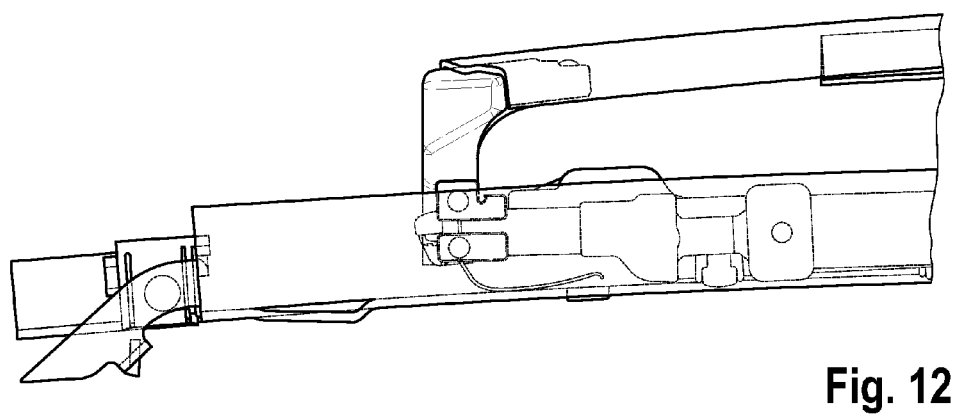

When the sliding roof system is actuated in order to transfer the cover to the raised position (see FIG. 8), the front end of the cover holder remains in the lowered position, in which the projection 42 continues to engage into the opening 40 of the sliding member 20. It is only a continued actuation of the sliding roof system that will cause the slide 16 to be adjusted rearward (see FIG. 9) until, finally, it is shifted to the rear so far that the projection 42 has come clear of the opening 40 and the sliding member 20 of the cover holder 12 can be freely shifted in the guide rail 14, first obliquely upward (cf. the motion sequence in FIGS. 8, 9, and 10) and finally further to the rear (see FIG. 11) until eventually the cover holder 12 can be shifted further to the rear together with the cover 10 (not illustrated in these figures) (see FIG. 12).

When the cover is closed, the motion sequence occurs in the reverse direction: shortly before reaching the closed position, the sliding member 20 of the cover holder 12 is lowered at the front edge of the guide rail, and the projection 42 is inserted into the opening 40 of the sliding member 20 as soon as the slide 16 reaches the region of its front final position. The front edge of the cover 10 is thereby reliably arrested again in the vertical direction.

The special advantage of the locking achieved in this way by the engagement of the projection 42 into the opening 40 resides in that it is realized automatically by the adjustment of the slide 16. Any separate actuation is not required.

Reference is also made to the following patent U.S. Pat. No. 7,784,859 and European Patent Publication No. EP 2072304A1 the contents each of which are incorporated herein in their entirety by reference thereto.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sliding roof system for a motor vehicle, comprising:
at least one guide rail;
a cover holder which is adjustable relative to the guide rail;
a slide which is shiftable in the guide rail; and
wherein the slide and the cover holder each have a locking member provided thereon, which are releasable from each other and engage into each other at least when the cover holder is in the closed position and wherein the locking member provided on the cover holder is fitted to a sliding member which is mounted for sliding movement in the guide rail, and wherein the sliding member is fitted to a front end of the cover holder.

2. The sliding roof system according to claim 1, wherein one of the locking members is an opening and the other is a projection which can be transferred into the opening.

3. The sliding roof system according to claim 2, wherein the opening is provided on the cover holder and the projection is rigidly fitted to the slide.

4. The sliding roof system according to claim 1, wherein the opening is provided on the cover holder and the projection is rigidly fitted to the slide.

5. The sliding roof system according to claim 4, wherein the projection includes an abutment edge which is set obliquely relative to the adjustment direction of the slide.

6. The sliding roof system according to claim 3, wherein the projection includes an abutment edge which is set obliquely relative to the adjustment direction of the slide.

7. The sliding roof system according to claim 1, wherein the projection includes an abutment edge which is set obliquely relative to the adjustment direction of the slide.

8. The sliding roof system according to claim 2, wherein the projection includes an abutment edge which is set obliquely relative to the adjustment direction of the slide.

9. The sliding roof system according to claim 8, wherein the projection is formed by two arms arranged parallel to each other.

10. The sliding roof system according to claim 7, wherein the projection is formed by two arms arranged parallel to each other.

11. The sliding roof system according to claim 6, wherein the projection is formed by two arms arranged parallel to each other.

12. The sliding roof system according to claim 5, wherein the projection is formed by two arms arranged parallel to each other.

13. The sliding roof system according to claim 1, wherein the projection is formed by two arms arranged parallel to each other.

14. The sliding roof system according to claim 2, wherein the projection is formed by two arms arranged parallel to each other.

15. The sliding roof system according to claim 3, wherein the projection is formed by two arms arranged parallel to each other.

16. The sliding roof system according to claim 4, wherein the projection is formed by two arms arranged parallel to each other.

* * * * *